United States Patent
Christopher et al.

(10) Patent No.: US 6,912,661 B1
(45) Date of Patent: Jun. 28, 2005

(54) METHOD AND APPARATUS FOR ENCRYPTING AND FOR DECRYPTING DATA ARRANGED IN A DATA SECTOR

(75) Inventors: Lauren Ann Christopher, Indianapolis, IN (US); Max Artigalas, Rennes Cedex (FR); Friedrich Rominger, Brigachtal (DE); Juergen Vogel, Brigachtal (DE); Alexander Kravtchenko, Villingen-Schwenningen (DE)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/355,219

(22) PCT Filed: Jan. 15, 1998

(86) PCT No.: PCT/EP98/00203

§ 371 (c)(1),
(2), (4) Date: Dec. 14, 1999

(87) PCT Pub. No.: WO98/33105

PCT Pub. Date: Jul. 30, 1998

(30) Foreign Application Priority Data

Jan. 24, 1997 (EP) ............................................. 97101125

(51) Int. Cl.$^7$ ......................... G06F 11/30; G06F 12/14; H04L 9/00

(52) U.S. Cl. ........................ 713/193; 713/156; 713/175
(58) Field of Search .......................................... 713/193

(56) References Cited

U.S. PATENT DOCUMENTS 5,623,459 A * 4/1997 Iwamura et al. ............ 369/126
5,675,645 A * 10/1997 Schwartz et al. ........... 713/187

* cited by examiner

*Primary Examiner*—Gregory Morse
*Assistant Examiner*—Christopher J. Brown
(74) *Attorney, Agent, or Firm*—McDermott Will & Emery LLP

(57) ABSTRACT

A method and apparatus for preventing unauthorized use of DVDs on a DVD ROM drive. The method comprises a DVD disc that includes special data processing. When the DVD is replayed on a standard DVD ROM drive the invention causes the output of the DVD ROM drive to be erroneous, such that the computer cannot use the data. According to the invention, when encoding a disc, the error correction and/or error detection bits, check bytes, are moved into the normal or main data area. When this scrambled data is output from a standard DVD ROM drive, the data in the check byte area is lost and the information is not useable. For authorized use, this scrambling is reversed before sending video and/or audio data to the MPED decoder and AC-3 decoder respectively.

18 Claims, 3 Drawing Sheets

Figure 1:
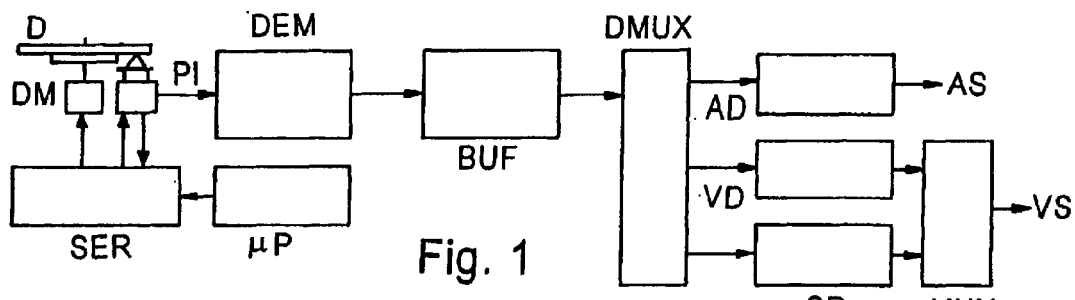

METHOD AND APPARATUS FOR ENCRYPTING AND FOR DECRYPTING DATA ARRANGED IN A DATA SECTOR

The present invention relates to a method and to an apparatus for encrypting and for decrypting data arranged in a data sector.

BACKGROUND

There will be DVD (digital versatile disc) discs and players on the market soon. Such discs will have a significantly increased data storage capacity when compared to the well-known CD (compact disc). One type of DVD disc is called DVD ROM and intended for use in a DVD ROM drive which is part of a PC (personal computer). DVD ROMs may carry 'normal' data as well as digital TV movie and/or audio data.

INVENTION

The DVD disc suppliers are interested in encrypting DVD data in order to prohibit unauthorized use of e.g. a movie play on a DVD ROM drive. In a computer, the DVD ROM drive has the capability to copy data on to another storage media where it could be pirated.

It is one object of the invention to disclose a method for encrypting data arranged in a data sector. This object is realised by the method disclosed in claim 1.

It is a further object of the invention to disclose a method for decrypting data arranged in a data sector. This object is realized by the method disclosed in claim 2.

it is a further object of the invention to disclose a data carrier containing data which are encrypted according to the inventive method. This object is realised by the data carrier disclosed in claim 6.

It is a further object of the invention to disclose an encoding apparatus which utilises the inventive method. This object is realised by the apparatus disclosed in claim 8.

It is a further object of the invention to disclose a decoding apparatus which utilises the inventive method. This object is realised by the apparatus disclosed in claim 9.

When a DVD disc including a special data processing is replayed on a standard DVD ROM drive the invention causes the output of the DVD ROM drive to be erroneous, such that the computer cannot use the data. According to the invention, when encoding a disc, the error correction and/or error detection bits, e.g. RS (Reed-Solomon) check bytes, are moved into the normal or main data area (and vice-versa when replaying the disc). When this scrambled data is output from a standard DVD ROM drive, the data in the check byte area is lost and the information is not useable. For an authorized use, this scrambling is reversed before sending video and/or audio data to the MPEG (motion picture experts group, ISO/IEC 13818 and 11172) decoder and AC-3 decoder 3, respectively. This kinds of decryption requires such a high processing power that for many years at least no cheap software-driven processor will be able to perform the modified descrambling. It would require a pirate to create a hardware modification which is difficult to achieve because the decryption circuitry is inside an IC and modified hardware would be easily detectable and could be subject to legal action.

Since scrambled or encrypted data could be decrypted on a computer theoretically (given enough time and a big enough computer), it is preferable to have piracy inhibit means that is closer to the disc data. This requirement is not for perfect protection, but only to put in place something that would require a hardware solution to reconstruct the correct data. The invention describes a surprisingly simple way to achieve this goal. An efficient way to do the encryption is to change the order of data stored on the disc as mentioned above.

In principle, the inventive encoding method is suited for encrypting data arranged in a data sector, wherein, following an addition of error detection and/or error protection data to said data sector,
- data from said data sector are arranged at or re-addressed to the location of said error detection and/or error protection data, in particular by exchanging it with data from said error detection and/or error protection data or by a corresponding re-addressing or
- data from said data sector are transformed to another representation using a predetermined rule.

In principle, the inventive decoding method is suited for decrypting data arranged in a data sector, wherein, following an addition of error detection and/or error protection data to said data sector at encoder side, and
- data from said data sector have been arranged at or re-addressed to the location of said error detection and/or error protection data, in particular by exchanging it with data from said error detection and/or error protection data or by a corresponding re-addressing or
- data from said data sector have been transformed to another representation using a predetermined rule,
- at decoder side said arranging at or re-addressing to the location of said error detection and/or error protection data is reversed correspondingly of said transformation is reversed by a corresponding predetermined rule and said error detection and/or error protection data is applied to said data sector data.

Advantageous additional embodiments of the inventive methods are disclosed in the respective dependent claims.

In principle the inventive apparatus for encrypting data arranged in a data sector includes:
- means for adding error detection and/or error protection data to said data sector,
- means for arranging or re-addressing data from said data sector to the location of said error detection and/or error protection data, in particular by exchanging it with data from said error detection and/or error protection data or by a corresponding re-addressing or
- means for transforming data from said data sector to another representation using a predetermined rule.

In principle the inventive apparatus for decrypting data arranged in a data sector, wherein, following an addition of error detection and/or error protection data to said data sector at encoder side,
- data from said data sector have been arranged at or re-addressed to the location of said error detection and/or error protection data, in particular by exchanging it with data from said error detection and/or error protection data or by a corresponding re-addressing or
- data from said data sector have been transformed to another representation using a predetermined rule, includes:
- means for reversing correspondingly said arranging or re-addressing to the location of said error detection and/or error protection data or
- means for reversing said transformation by a corresponding predetermined rule,
- means for applying said error detection and/or error protection data to said data sector data.

DRAWINGS

Figure 2:
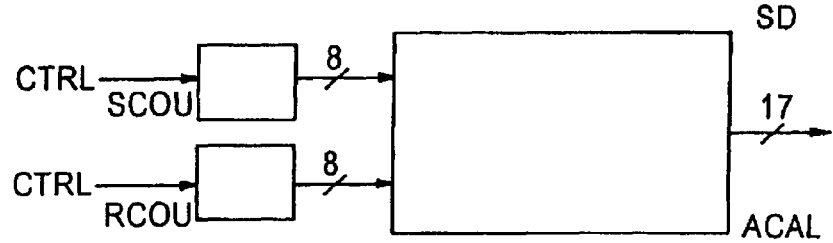
Figure 5:
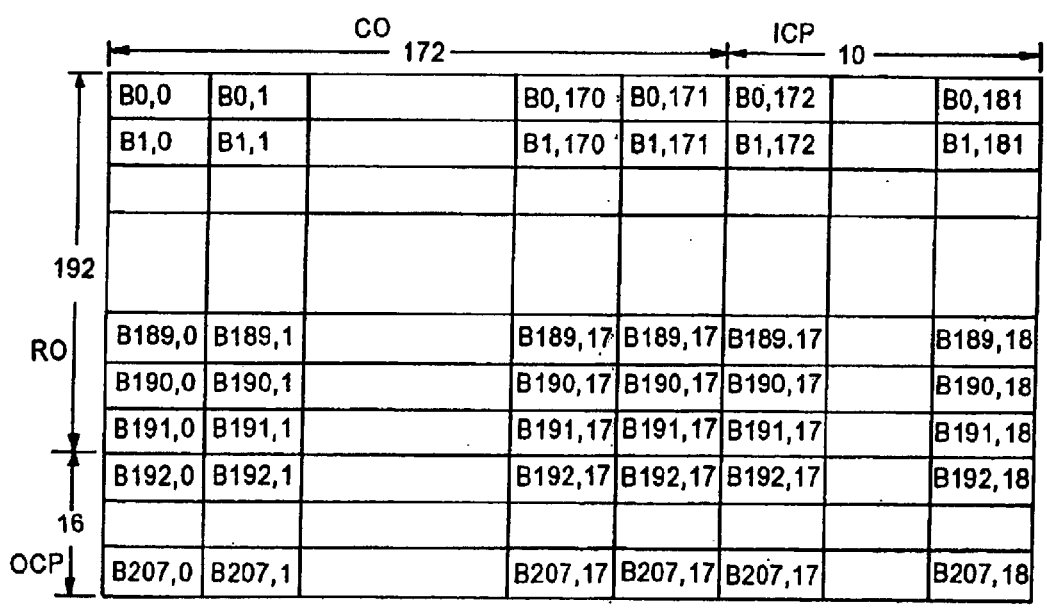
Figure 6:
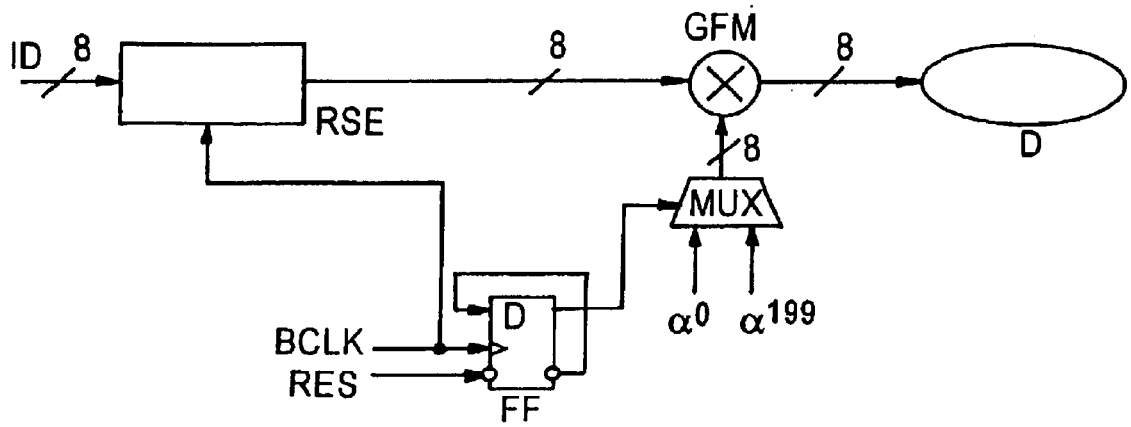
Figure 7:
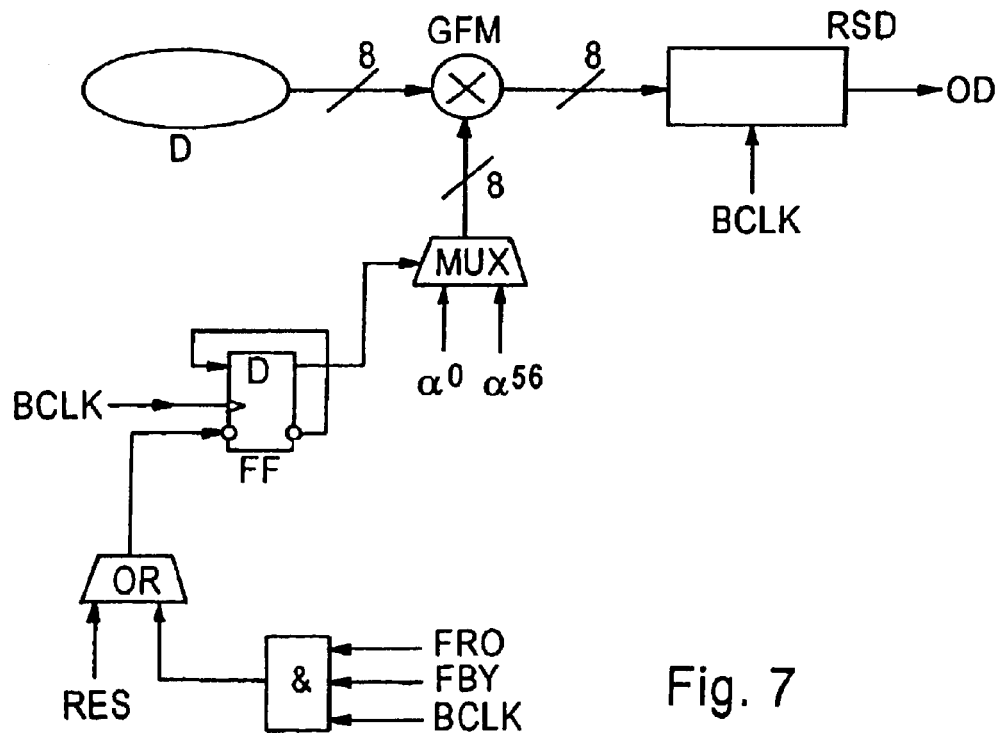

Preferred embodiments of the invention are described with reference to the accompanying drawings, which show in:

FIG. 1 simplified block diagram of a DVD player;

FIG. 2 address generation means;

FIG. 3 data exchange in a recording sector according to a first embodiment of the invention;

FIG. 4 data exchange in rows of a recording sector according to the first embodiment of the invention;

FIG. 5 recording sector configuration in more detail;

FIG. 6 data exchange encoder according to a second embodiment of the invention;

FIG. 7 data exchange decoder for the second embodiment of the invention.

PREFERRED EMBODIMENTS

The data are arranged on the disc as physical data sectors. In order to construct such physical data sectors the following procedure is carried out. The original data (main data) to be recorded become arranged in data sectors containing the main data and some additional information like ID (identification) data and EDC (error detection code). The data sectors may be arranged in e.g. 12 rows by 172 bytes blocks. The ID data can be located at the beginning of the first row. The EDC data can be located at the end of the last row. These 2064-bit blocks or data sectors may undergo a first scrambling process for the 2048-bit main data contained therein, for example by using a feedback shift register with an Exclusive-OR logical operation. E.g. each 16 of the resulting data sectors may be combined in order to form a recording sector, following an ECC (error correction code) encoding of the group of data sectors.

Figure 3A:
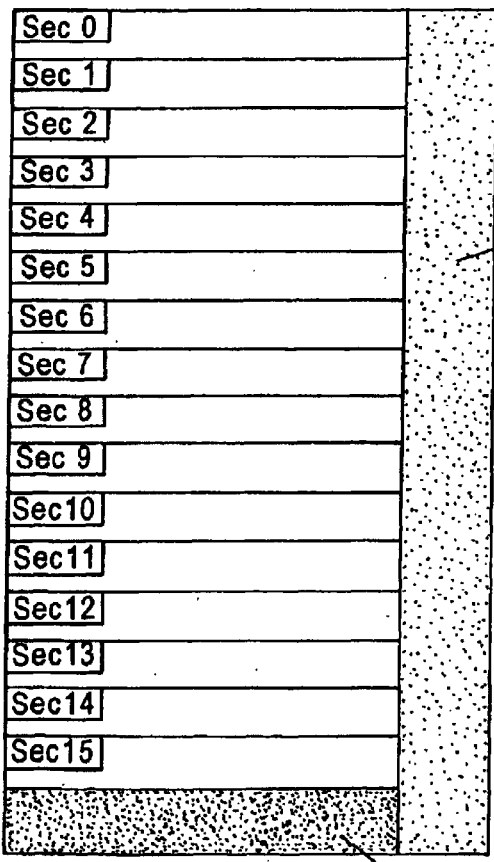

The recording sector or ECC block configuration is shown in FIG. 3A more generally and in FIG. 5 in more detail. A cross RS error correction code is applied to the group of 16 data sectors, having in total 192 rows RO and 172 columns CO of bytes. Thereby the ECC block gets a supplement consisting of an outer-code parity OCP and an inner-code parity ICP. The OCP may consist of 16 additional rows of 172 bytes each. The subsequent ICP may consist of 208 columns of 10 additional bytes each. OCP and ICP can be calculated using remainder polynomials.

The inner-code parity ICP has a minimum distance of e.g. d=11. This means that the inner RS parity code can be used to correct up to five errors only. If there are more than five errors, the related code is uncorrectable and is marked as 'bad' data.

The outer-code parity OCP has a minimum distance of e.g. d=17. This means that the outer RS parity code can be used to correct up to eight errors only. If there are more than eight errors, the related code is uncorrectable and is marked as 'bad' data.

Thereafter a row interleaving step may be added wherein in each case one of the 16 OCP rows is inserted in a different order e.g. below the last row of each data sector partition Sec0 to Sec15. This step is not depicted in FIGS. 3A and B.

In the invention, e.g. all or only some of the ICP bits or bytes of a row—preferably together with some e.g. adjacent bits or bytes of the main data—are exchanged with a corresponding number of bits or bytes of main data in that row or another row. The scrambling can be performed for every row or not for all rows of a sector, in each row concerned in the same area or not in the same area, in every sector partition or not in every sector partition.

When decoding in a DVD ROM player, this scrambling of data is reversed.

Figure 3B:
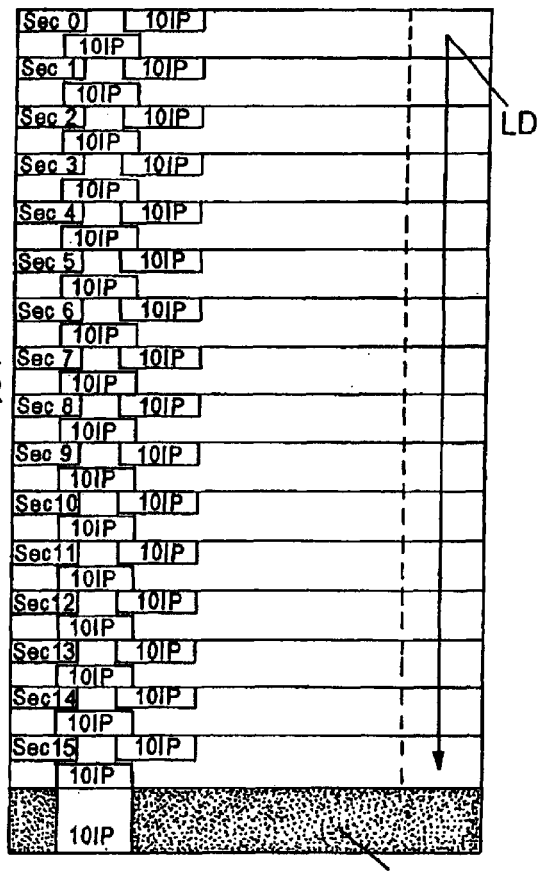

The main scrambling condition is that the data is modified in a way that a decoder not carrying out the reversed address transformation ADTR outputs rubbish because, instead of ICP data, 'lost' data ID only are used for the ECC process at decoder side, see FIG. 3B. That condition is fulfilled if a number of errors is introduced artificially which is higher than the number of correctable errors. Because the error correction data ICP and/or OCP are included in the data re-ordering there is practically no way, neither in the inner nor in the outer ECC processing, to reconstruct the data. If the parity symbol (or the data which was meant to be the parity symbols) is 'destroyed' prior to RS-decoding, it cannot be corrected. Without specifically designed hardware the encryption is not breakable.

Before forming a physical sector, sync codes can be added to the recording sector data and ECC block data, respectively. In addition, a channel modulation can be added, e.g. by converting 8-bit input data to 16-bit channel code words using one or more conversion tables.

One possible re-ordering in an ECC-block after row interleaving for each sector is:

$Byte_{r1,16} \ldots {}_{167} \rightarrow Byte_{r1,30}, \ldots {}_{181}, Byte_{r1,168}, \ldots {}_{181} \rightarrow Byte_{r1,16,\ldots 29}$ $Byte_{r2,0}, \ldots {}_{167} \rightarrow Byte_{r2,14}, \ldots {}_{181}, Byte_{r2,168}, \ldots {}_{181} \rightarrow Byte_{r2,0,\ldots 13}$ where r1=row 0 to 3 in a data sector partition and r2=row 4 to 11 or 12 in that data sector partition of the current recording sector.

It is also possible to shift OCP data and main data in the vertical direction only or in addition to the above described horizontal shifting. This would increase the level of encryption but would also increase the hardware complexity.

FIG. 2 shows a block diagram for address calculation. Address calculation circuit ACAL contains the inventive address reordering. ACAL is controlled by symbol counter means SCOU and row counter means RCOU, both of which receive respective control signals CTRL from a central control processor. For the corresponding descrambling at decoder side the original address generation for data input to a RAM memory in a recording channel IC is carried out with e.g. the following formulas:

SN=[0 . . . 181],
RN=[0 . . . 207]
RNP=[12+0*13, 12+1*13, 12+2*13, . . . , 12+15*13]

wherein SN is a symbol number in the row, RN is a row number and RNP are rows containing OCP parity data.

Based on a certain RAM configuration, for rows with parity data the address is:

$RAM\text{-address}=((RNP-12)/13+192)*256+SN$ and for rows with main data the address is:

$RAM\text{-address}=((RN-INT(RN/13))*256+SN$

For the same RAM configuration, the inventive addresses can be generated as follows:

For rows RN=0 to RN=3 of a current data sector partition of a current recording sector the last four data symbols plus the ten ICP parity symbols are shifted from the end of the row to the left part of the row.

```
IF (SN < 16)
    SN1 = SN
ELSE IF (SN < 30)
    SN1 = SN + 152
ELSE
    SN1 = SN - 14
ENDIF
``` wherein SN1 is the symbol number needed for the descrambling according to the invention.

In a channel demodulation step e.g. 16-bit input data words are converted using a look-up table into 16-bit output data words containing 8 bits of valid data and 8 bits of invalid data (i.e. data which is marked as being invalid) which are stored in the RAM together with the valid data. The data can be marked as being invalid or valid, respectively, using erasure data bytes in which each bit corresponds to a byte from the channel demodulation output and defines whether that channel demodulation output byte is valid or not. The erasure byte addresses are denoted SNE. Since the row length of 182 bytes divided by 8 gives 22 and a rest of 6, one needs 22 erasure bytes and one 6-bit erasure word for a row. Without using the invention, for the same RAM configuration SNE would equal SN/8 for all SN numbers of the row. At the end of a row one 6-bit erasure word would be arranged.

Advantageously, the SNE calculation is not significantly more complex if the invention is used. For SN=0 to SN=29 SNE equals SN/8 and for SN=30 to SN=181 SNE equals (SN+2)/8. The 6-bit erasure word is stored under address SN=29. Therefore the original storage arrangement of one 6-bit erasure word per row is kept.

The new SNE value SNE1 can be calculated with the following formula:

```
IF (SNE < 2)
    SNE1 = SNE
ELSE IF (SNE < 4)
    SNE1 = SNE + 19
ELSE
    SNE1 = SNE - 2
ENDIF
```

For rows RN=4 to RN=11 or 12 of the current data sector partition of a current recording sector the last four main data symbols plus the ten ICP parity symbols are shifted to the very first beginning of the row.

```
IF (SN < 14)
    SN2 = SN + 168
ELSE
    SN2 = SN - 14
ENDIF
``` wherein SN2 is the symbol number needed for the descrambling according to the invention.

For SN=0 to SN=13 SNE equals SN/8 and for SN=14 to SN=181 SNE equals (SN+2)/8. The 6-bit erasure word is stored under address SN=13. Therefore the original storage arrangement of one 6-bit erasure word per row is kept.

The new SNE value SNE2 can be calculated with the following formula:

```
IF (SNE < 2)
    SNE2 = SNE + 21
ELSE
    SNE2 = SNE - 2
ENDIF
```

For rows RNP with parity data the RAM address is (for the same RAM configuration):

$$RAM\text{-address}=((RNP-12)/13+192)*256+SN2$$

For non-parity data rows of the replayed recording sector the RAM address is:
For (RN modulo 13)<4:

$$RAM\text{-address}=((RN-INT(RN/13))*256+SN1$$

and for (RN modulo 13)≧4:

$$RAM\text{-address}=((RN-INT(RN/13))*256+SN2$$

wherein INT means integer division.

If the OCP row interleaving was not carried out at encoder side the number '13' is replaced by the number '12'.

As mentioned above, the descrambling may be carried out in some e.g. upper data sector partitions only of a recording sector, corresponding to the scrambling on encoding side.

Figure 4A:
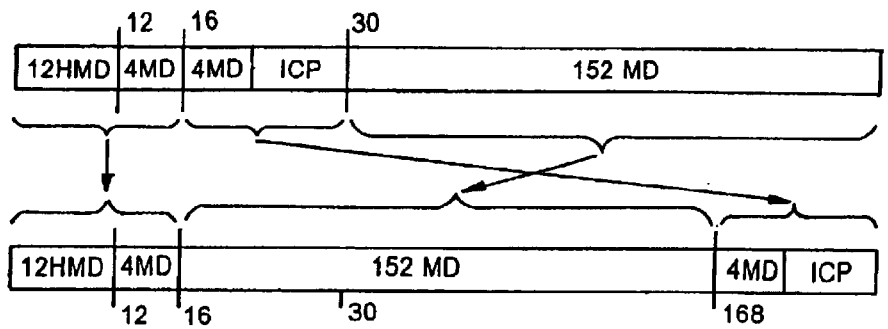
Figure 4B:
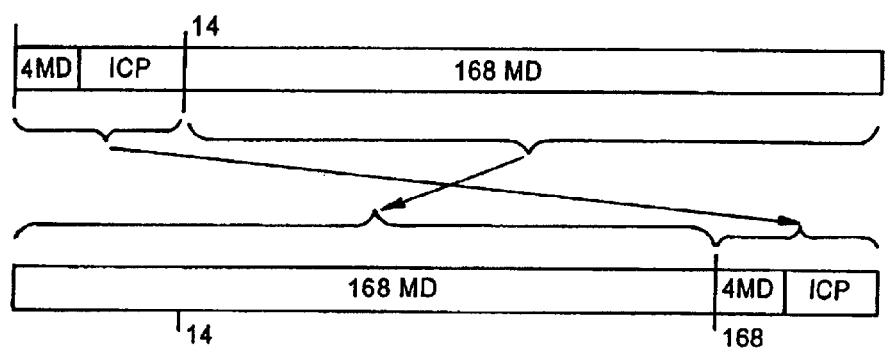

The corresponding descrambling at decoder side is depicted in FIG. 4A for codewords in row RN=0 to RN=3 of the current data sector and in FIG. 4B for codewords in rows RN=4 to RN=11 or 12 of the current data sector. Although the first row only of a data sector may contain identification or header data which should not be subject to scrambling, the scrambling/descrambling according to the invention can be carried out e.g. in the upper four rows of a data sector partition differently from the remaining rows of that data sector. This will increase the level of encryption. The upper row in FIG. 4A represents scrambled data and contains a sequence of 12 header data bytes HMD for main data, 4 main data bytes MD, 4 shifted main data bytes MD, 10 shifted ICP bytes, and 152 shifted main data bytes MD. The lower row represents descrambled data and contains a sequence of 12 header data bytes HMD for main data, 4 main data bytes MD, 152 re-shifted main data bytes MD, 4 re-shifted main data bytes MD, and 10 re-shifted ICP bytes. The upper row in FIG. 4B represents scrambled data and contains a sequence of 4 shifted main data bytes MD, 10 shifted ICP bytes, and 168 shifted main data bytes MD. The lower row represents descrambled data and contains a sequence of 168 re-shifted main data bytes MD, 4 re-shifted main data bytes MD, and 10 re-shifted ICP bytes.

In FIG. 1 a DVD ROM disc D is driven by a disc motor DM. The information from the disc is read by a laser pick-up PI which provides servo control data to servo means SER and information including physical sector data to decoding means DEM. SER and the other blocks following and including DEM can be controlled by a microprocessor $\mu P$. Servo means SER control the speed of DM and the position of PI. In DEM a processing takes place which is the inverse to the encoding steps described above, i.e. synchronization and channel demodulation, descrambling according to the invention, OCP row de-interleaving step if carried out when encoding, ECC processing, 2048-bit main data descrambling if carried out when encoding, EDC processing, and ID and main data processing. In the channel demodulation step e.g. 16-bit input data words are converted using a look-up table into 16-bit output data words containing 8 bits of valid data and 8 bits of erasure data as mentioned above which together are stored in a RAM area.

The DEM output data pass through a bit buffer BUF to a demultiplexer DMUX which delivers the related partitions of the input data stream to an audio data decoder AD outputting the audio signal or signals AS, to a video data decoder VD, and to a subpicture data decoder SD. Output signals of VD and SD are combined in a multiplexer MUX which provides a video signal VS.

An item of information concerning the presence of the inventive encryption can be inserted into the disc directory or into header data of the DVD disc. Such disc directory/header data is not scrambled. This allows any DVD player to evaluate that item of information without being able to decrypt the main data. Advantageously, the DVD player can signal the evaluation result on its display or to a PC.

Also in the second embodiment of the invention the data are changed after RS encoding and inversely changed at decoder side before RS decoding. In this embodiment, each code word contains uncorrectable errors and prevents a standard DVD player from correctly processing the data read from the disc.

At encoder side the input data ID pass through an RS encoder RSE as depicted in FIG. 6. The output of RSE is connected to a Galois field multiplier GFM the output signal of which is processed as described for the first embodiment before recording it on the disc D. RSE and a flip-flop FF are clocked by a byte clock BCLK. FF can be reset using signal RES. The inverted output of FF is connected to the data input of FF. The FF output controls a multiplexer MUX the output of which supplies the second input of GFM. GFM multiplies or transforms the data at its first input with either a coefficient $\alpha 0$ (Galois field element) or a coefficient $\alpha 199$ (Galoi's field element). FF synchronizes the symbol stream with GFM. Each current odd symbol or byte of a code word is divided by Galois element $\alpha 255$ which corresponds to a multiplication with $\alpha 0$.

Each current even symbol or byte of a code word is divided by Galois element $\alpha 56$. This corresponds to a multiplication with $\alpha 199$. This operation introduces at least 91 errors into each ICP code word of a row which leads to uncorrectable ICP code words being recorded on disk D.

In order to reconstruct the original representation of data, a correspondingly inverse processing or transformation is performed at decoder side. The disc data is processed as described for the first embodiment before passing it through a Galoi field multiplier GFM to an RS decoder RSD as shown in FIG. 7. RSD receives also the byte clock BCLK and outputs the RS decoded signal OD. Again, the second input of GFM is supplied from the output signal of a multiplexer MUX. MUX connects either the coefficient $\alpha 0$ (Galois field element) or the coefficient $\alpha 56$ (Galois field element) to the second input of GFM. Flip-flop FF is connected like in FIG. 6 and synchronizes the symbol stream with GFM.

Each current even symbol or byte of a code word is multiplied by Galois element $\alpha 56$.

Each current odd symbol or byte of a code word is multiplied by Galois element $\alpha 0$.

What is claimed is:

1. A method of recording data, in encrypted form, in a sector of a data carrier, the sector comprising a content data part and an error detection and/or error protection data part, the method comprising the steps of:

exchanging a portion of content data with error detection and/or error protection data; and recording the portion of the content data in the error detection and/or error protection data part.

2. A method according to claim 1, comprising modifying each symbol or byte of the content data according to a predetermined rule before said portion of the content data is arranged at or re-addressed to the error detection and/or error protection data part.

3. A method according to claim 2, wherein said predetermined rule comprises each odd symbol or byte of the content data being modified so as to be divided by Galois element $\alpha 255$ and each even symbol or byte of the content data being modified so as to be divided by Galois element $\alpha 56$ of the same Galois field.

4. A method according to any one of claims 1 to 2, wherein said sector is two-dimensional and includes a first plurality of rows comprising content data bytes and terminal inner code parity bytes and a second plurality of rows, following the first plurality of rows, including outer code parity bytes and terminal inner code parity bytes, the outer code parity bytes and the inner code parity bytes constituting the error detection and/or error protection data part.

5. A method according to claim 4, wherein the arranging or re-addressing of said portion of the content data comprises swapping inner code parity bytes with content data bytes.

6. A method according to claim 5, wherein said inner code parity bytes are swapped with content data bytes in the same row.

7. A method according to claim 4, wherein said content part comprises 192 rows, each row comprising 172 bytes, and the error detection and/or error protection data part comprises an outer code parity part of 16 rows or 172 bytes following the content part and an inner code parity part comprising 10 additional bytes at the end of each said row.

8. A method according to claim 1, wherein the error detection and/or error protection data is produced by Reed-Solomon coding.

9. A data carrier recorded by the method according to claim 1.

10. A DVD-ROM disk according to claim 9.

11. An apparatus configured to perform the method according to claim 1, the apparatus comprising:

an encoder which adds error detection and/or error protection data to said content data; and an address unit which causes a portion of the content data to be arranged at or re-addressed to the error detection and/or error protection data part.

12. An apparatus according to claim 11, including a transformation unit which modifies each symbol of the content data according to a predetermined rule.

13. A method of reading data from a data carrier, the data being recorded according to the method of claim 1, the method comprising the step of:

relocating the portion of the content data read from the error detection and/or error protection data part to an original position of the rest of the content data.

14. A method according to claim 13, including modifying each symbol of the content data, read from the data carrier, according to a predetermined rule so as to reverse a modification performed according to an inverse rule before recording or the symbol to the data carrier.

15. An apparatus configured to perform a method according to claim 13 or 14, the apparatus comprising:

a relocation unit which relocates content data read from the error detection and/or error protection data part to an original position of the rest of the content data; and an error detection/correction unit which applies the error detection and/or error protection data to the content data for error detection or protection thereof.

16. An apparatus according to claim 15, including a transformation unit which modifies each symbol of the content data, read from the data carrier, according to a predetermined rule so as to reverse a modification performed according to an inverse rule before recording of the symbol to the data carrier.

17. A method according to claim 4, comprising inserting a row of the second plurality of rows between two rows of the first plurality of rows.

18. A method according to claim 17, wherein the arranging or re-addressing of said portion of the content data comprises swapping inner code parity bytes with content data bytes.

* * * * *